United States Patent [19]

Deans

[11] Patent Number: 5,336,415

[45] Date of Patent: Aug. 9, 1994

[54] REMOVING POLYVALENT METALS FROM AQUEOUS WASTE STREAMS WITH CHITOSAN AND HALOGENATING AGENTS

[75] Inventor: John R. Deans, Bellevue, Wash.

[73] Assignee: Vanson L.P., Redmond, Wash.

[21] Appl. No.: 12,572

[22] Filed: Feb. 10, 1993

[51] Int. Cl.$^5$ .............................................. C02F 1/54
[52] U.S. Cl. .................................. 210/725; 210/728; 210/730; 210/912; 210/913; 210/914
[58] Field of Search ................ 210/725, 727, 728, 730, 210/735, 912–914; 530/420; 536/20

[56] References Cited

U.S. PATENT DOCUMENTS

| | | | |
|---|---|---|---|
| 3,533,940 | 10/1970 | Peniston et al. | 210/730 |
| 3,635,818 | 1/1972 | Muzzarelli nee Weckx | 210/31 C |
| 4,125,708 | 11/1978 | Masri et al. | 536/20 |
| 4,285,819 | 8/1981 | Yen et al. | 210/679 |
| 4,775,650 | 10/1988 | Portier | 502/62 |
| 4,882,066 | 11/1989 | Portier | 210/679 |
| 4,992,180 | 2/1991 | Onodera et al. | 210/688 |
| 5,010,181 | 4/1991 | Coughlin | 536/20 |
| 5,204,452 | 4/1993 | Dingilian et al. | 210/735 |

FOREIGN PATENT DOCUMENTS

WO9002708 3/1990 PCT Int'l Appl. ............... 210/730

*Primary Examiner*—Peter A. Hruskoci

[57] ABSTRACT

A process for the removal of soluble polyvalent metal impurities from aqueous streams, the polyvalent metal selected from groups IIIA, IIIB, IVA, IVB, VA, VB, VIB, VIIB, and VIII in the periodic table of elements, is disclosed. The process comprises, in order:

(1) dissolving (a) chitosan or a water soluble salt thereof and (b) a halogenating agent capable of converting chitosan to an N-halochitosan in an aqueous stream that (i) contains said polyvalent metal impurity as a cationic or complex anionic moiety and (ii) is at a pH of 2 to 5.5, wherein an effective amount of N-halochitosan is formed in said aqueous stream to remove said polyvalent metal impurity;

(2) raising the pH of the aqueous stream to a pH greater than 6, the pH being sufficiently high to form an insoluble product containing the polyvalent metal impurity and said N-halochitosan; and (3) separating the insoluble product from the aqueous stream.

18 Claims, No Drawings

REMOVING POLYVALENT METALS FROM AQUEOUS WASTE STREAMS WITH CHITOSAN AND HALOGENATING AGENTS

1. Field of the Invention

This invention relates to a process for removing polyvalent metal impurities (and thereby decreasing their concentration in) from aqueous streams. More particularly, it relates to such process which comprises treating the stream with chitosan and a halogenating agent to flocculate and/or precipitate the metals from the solution. The invention further relates to new compositions of matter comprising the flocculated and/or precipitated metal impurities produced by the invention process.

2. Background and Related Prior Art

Chitosan is a polymeric amine composed primarily of units of glucosamine, i.e., 2-deoxy-2-amino-D-glucose derived from chitin. Chitin, a polymer of beta-1,4-(2-deoxy-2-acetamidoglucose), occurs widely in nature, e.g., as a principal constituent of the exoskeleton of many arthropods and insects and is convertible to chitosan by hydrolysis of some (and generally a major proportion) of the acetamido groups to amino groups, thereby rendering chitosan soluble in aqueous acid where it is present as a polycation.

Polycations are known to aid in flocculation, and chitosan has been used as a flocculant in the treatment of drinking water supplies and waste water streams, including for the removal of metal ion pollutants ostensibly through chelation of the ions by the amino groups of chitosan [U.S. Pat. Nos. 3,635,818, 4,125,708, 4,285,819, 4,775,650, 4,882,066, 4,992,180, 5,010,181].

Such use of chitosan as chelating agent for the removal of metals is not entirely satisfactory. As stricter regulations are being applied to municipal and industrial waste water treatments, more efficient processes are needed to minimize the residual content of noxious metals—generally heavy metals—in waste streams being discharged into the waterways of the environment.

SUMMARY OF THE INVENTION

The invention is a process for the removal of polyvalent metal impurities from aqueous streams, the process comprising, in order:

(1) dissolving (a) chitosan or a water soluble salt thereof and (b) a halogenating agent capable of converting chitosan to an N-halochitosan in an aqueous stream that (i) contains a polyvalent metal as a cationic or complex anionic moiety and (ii) is at a pH less than 6;

(2) raising the pH of the aqueous stream to a pH greater than 6, the pH being sufficiently high to form an insoluble product containing a substantial portion of the polyvalent metal; and (3) separating the insoluble product from the aqueous stream.

A more specifically (A) and (B) are dissolved in (C) at a first acid pH which is insufficiently high to result in the formation of a substantial amount of the flocculate or precipitate, then the pH is raised to a second pH (as by the addition of alkali) sufficiently high to result in the formation of a substantial amount of the flocculated and/or precipitated product containing a substantial proportion of the metal impurity content of the waste stream.

The first pH is generally below about 6, preferably between about 2 and 5.5, and the second pH is at least about 6 and preferably is between about 6 and 7.5.

The relative proportions of A, B and C, the halogenating potential of B and its residence time in the solution, the pH, and the temperature are readily coordinated so as to optimize the formation of the insoluble metal-containing product.

By this method, the concentrations of soluble polyvalent metal components of aqueous streams, in particular soluble metals of Groups III through VIII of the Periodic Table of the Elements, and more particularly the so-called heavy metals characterized as having solid state densities of at least 5.0, for example, vanadium, may be lowered to levels lower than are obtainable with alkali treatment alone or with an equivalent amount of chitosan alone at any pH, including lowering to environmentally acceptable levels, even into the low parts per billion (ppb) range. Further, the invention method can substantially lower the concentration of such a normally difficult-to-remove metal as aluminum from aqueous streams.

The recovered product comprises chitosan or N-halochitosan and/or a reaction product of chitosan and the N-halochitosan along with the metal impurities removed in the process. The metal content of such product can be recovered for reuse, for example, as chemical process catalysts or as alloying or plating metals, by methods known to the art, for example, by combustion to form the corresponding metal oxides, which may be recovered as such or may be further processed if desired, e.g., reduced to the metallic state.

DESCRIPTION OF THE PREFERRED EMBODIMENTS

The invention process is applicable to the recovery of polyvalent metal impurities present in water solutions as cationic and/or complex anionic moieties, including oxycations and polyhalo-, oxyhalo- and oxyanions. The counterion may vary widely, provided the metal compound/compounds is/are soluble in aqueous acid. In particular, the polyvalent metal is at least one of Group III A, III B, IV A, IV B, V A, V B, VI B, VII B and VIII of the Periodic Table of the Elements. Included are Al and the transition metals of the first, second and third series, especially the heavy metal (generally the most noxious) members therein. Representative of these metals are V, Cr, Co, Zr, Pd, Cd, Sb, Os, Pt, Au, Hg, Pb, Th and U. In one particular embodiment the metal impurity is aluminum, vanadium or a mixture thereof.

The initial concentration of the soluble metal impurities in the aqueous stream may range widely and may be quite low, for example, as low as about 50 parts per billion (ppb), i.e., 0.05 ppm, more usually at least about 100 ppb. Although aqueous streams containing higher metal concentrations may also be treated successfully in accordance with the invention method, it may be economically advantageous to first precipitate at least some of the polyvalent metal moieties as hydroxides/oxides at selected pHs and remove the precipitate before adding chitosan and a halogenating agent to lower the soluble metal content of the solution still further.

The pH of the aqueous stream is normally in the range of about 1 to 6, more usually about 2 to about 5.5. In the preferred embodiment the chitosan and halogenating components are dissolved in the aqueous stream at a pH below about 6, more preferably about 5.5, and the pH subsequently raised to an effective flocculating/precipitating pH as described above.

The chitosan employed herein, sometimes referred to as deacetylated or partially deacetylated chitin, can vary widely as to its molecular weight, which can be represented by the total number of 2-deoxy-2-aminoglucose units and 2-deoxy-acetamidoglucose units it contains and by the relative distribution of these units in the molecule, provided it is insoluble in water in its unprotonated state, e.g., at neutral or near neutral pH, and soluble in its protonated state at acidic pHs. In general, for use in this invention the amino content should predominate over the acetamido content. Typical and suitable chitosan contains 45 to 100% 2-deoxy-2-aminoglucose units and 55 to 0% 2-deoxy-2-acetamidoglucose units, preferably at least 80% amino units and less than 20% acetamido units. Chitosan of such composition is conveniently handled as a water-miscible solution in dilute aqueous carboxylic acid, e.g., acetic, formic or the like.

The halogenating agent can also vary widely as to its chemical constitution, provided it is independently capable of converting chitosan amino groups to N-haloamino groups in aqueous acid solution in accordance with the method of the invention. Included are inorganic (preferably) and organic halogenating agents having positive halogen, i.e., a halogen such as chlorine or bromine, bound to a strongly electronegative atom such as oxygen, nitrogen or another halogen, and capable of donating a positively charged halogen atom. Suitable halogenating agents include sodium hypochlorite, calcium hypochlorite, chlorine, bromine, aqueous chlorine solutions, aqueous bromine solutions, N-chlorosuccinimide, sodium hypobromite, pyridinium bromide perbromide, N-bromosuccinimide, chloramine-T, and the like. Other suitable halogenating agents will be readily apparent to those skilled in the art. Sodium hypochlorite is preferred because of its ready availability and low cost.

In carrying out the process of the invention, chitosan (or a salt thereof) and a halogenating agent as described above are added in any order to the aqueous stream. It is preferred, however, to add the chitosan first, accompanied, if necessary, by the addition of a compatible acid to ensure a solution of the chitosan in the waste stream preferably at a pH below about 6. The acid must be environmentally acceptable if its effluent is waste; or biologically acceptable if the effluent is waste; or biologically acceptable if the effluent is for human or animal consumption. The chitosan is generally employed at a concentration of about 0.1 to about 5 parts by weight per part by weight of the total soluble polyvalent metal content of the aqueous stream, preferably about 0.25 to 2.5 parts per part of said metal content, with higher chitosan concentrations usually unnecessary. Optimum chitosan to polyvalent metal ratios, which may vary with the particular chitosan employed and the particular soluble metals to be removed, are readily determined by trial. For example, a water stream having a pH of 3.9 and containing 50,000 ppb of tetravalent and/or pentavalent vanadium and 260,000 ppb of trivalent aluminum is treated in accordance with the invention with about 0.5 parts of a chitosan as defined per part of the soluble vanadium and aluminum content of the stream together with an appropriate quantity of a halogenating agent.

The quantity of the halogenating agent added normally corresponds to from about 0.1 to about 1.5 positive halogens, more usually from about 0.3 to 1.0 such halogens, per amino group of the chitosan. As with the chitosan component, optimum proportions for removing/precipitating the metals are readily determined by trial.

Following the incorporation of chitosan and a suitable halogenating agent into the water solution at a first pH below the pH at which chitosan and the halogenating agent effectively interact to form a substantial amount of a flocculated or precipitated product containing a substantial, preferably major, proportion of the soluble metal content of the waste stream, the pH is raised to a second pH, i.e., a pH at which the chitosan and halogenating agent react to form the desired metal-containing flocculated and/or precipitated product.

The first pH, normally less than about 6, is preferably between 2 and 5.5. The second pH is generally at least about 6 and may range upwards to 6.5, even to pH 7 or higher, so long as there is produced the desired flocculated and/or precipitated product containing a substantial, preferably major, proportion of the soluble metal content of the aqueous stream, more preferably at least 75% of the total and most preferably at least 90% of the total.

The mechanism of the removal of the soluble polyvalent metals from their solution in an aqueous stream to such a high degree is not completely understood. It is believed, however, the effectiveness of the process depends on one or more of the following factors:

(1) in situ reaction of the halogenating agent with chitosan to convert a portion of the chitosan amino groups to N-haloamino groups, which may occur at the first or second pH;

(2) subsequent reaction of at least some of the N-haloamino groups with residual amino groups of chitosan at the second (higher) pH, at which pH the concentration of unprotonated amino groups is higher than at the first pH, to form a cross-linked chitosan composition, possibly as a caged structure, less soluble in the medium than chitosan itself; and (3) formation at the second pH of insoluble hydroxides and oxides of one or more of the metals to be removed, which become entrapped in the cross-linked chitosan structure or react via their oxide or hydroxide groups with residual haloamino groups of chitosan and become chemically bonded to the chitosan structure, and are flocculated or precipitated with it.

The process conditions of pH, temperature and time for the formation of any particular N-haloamino chitosan intermediate and its subsequent reaction with amino chitosan to form a more highly insoluble reaction product can be independently determined in the absence of the soluble metals to optimize the conditions to be used in the metal removal process. In general, however, depending on the halogenating agent chosen, the halogenation of chitosan to workable proportions of N-haloamino groups requires from 1 to 60 minutes at a suitable pH and ordinary temperatures. With sodium hypochlorite, the reaction is rapid over a range of temperatures and the desired flocculation/precipitation reaction can be complete in 10 minutes or less, particularly at the higher, second pH of the preferred process. Less reactive halogenating agents such as N-bromosuccinimide may require 30–60 minutes, even longer depending on the temperature.

The temperature can vary from near freezing of the aqueous stream solution to about 80° C., with ambient 15° to 30° C. temperatures preferred to minimize possible decomposition of the in situ-formed N-haloamino chitosan at the higher temperatures.

The following Examples illustrate the invention process and the results achieved thereby.

EXAMPLES

The chitosan used in the Examples below was made from Dungeness crab and contained 94.7% 2-deoxy-2-aminoglucose units and 5.3% 2-deoxy-2-acetamidoglucose units. One gram of this chitosan dissolved when dispersed in 100 ml of deionized water containing 1 gram of glacial acetic acid. The resulting solution had an apparent viscosity of 360 cps measured with a Brookfield Viscometer.

The vanadium-aluminum solution employed below consisted essentially of a 5 gal. sample of a process plant aqueous waste stream. It contained 53,000 ppb soluble vanadium and 268,000 ppb soluble aluminum had a grayish-blue color and had a pH of 3.9.

EXAMPLE 1

To 250 ml of the above-described vanadium-aluminum waste process stream at 20° C. was added with agitation sufficient of the chitosan aqueous acetic acid solution to provide 160 ppm of chitosan. To the resulting solution was added 0.6 ml of a 5.25% by weight sodium hypochlorite (standard bleach) solution, thereby providing an amount of positive chlorine stoichiometrically equivalent to the amino content of the chitosan.

The pH was then raised to 6.0 by the addition of 1N NaOH, whereupon a floc formed. The solution was allowed to stand for 3 minutes, and the floc removed from the liquid phase, which was analyzed for vanadium and aluminum by ICP (induced coupled plasma Spectiophotometry, EPA method 6010), which results are presented in Table 1.

EXAMPLE 2

The procedure of Example 1 was repeated except that the pH of the vanadium-aluminum solution was raised from 3.9 to 6.0 by the addition of 1N NaOH before the chitosan and hypochlorite solutions were added. The results are given in Table 1.

EXAMPLE 3

The procedure of Example 1 was repeated except that after the chitosan was added to the vanadium-aluminum solution the pH was raised from 3.9 to 6.0 before the equivalent amount of sodium hypochlorite was added. The results are given in Table 1.

TABLE 1

| Example | Untreated V-Al Solution | | Treated V-Al Solution | |
|---|---|---|---|---|
| | V, ppb | Al, ppb | V, ppb | Al, ppb |
| 1 | 53,000 | 258,000 | <50* | 110 |
| 2 | 53,000 | 258,000 | 27,000 | ** |
| 3 | 53,000 | 258,000 | 26,000 | ** |

*Below the detectable limit.
**Not determined.

The results show that the invention process is highly effective to lower the soluble metal content of the aqueous stream, in particular when carried out in accordance with the preferred embodiment illustrated by means of Example 1.

I claim:

1. A process for the removal of soluble polyvalent metal impurities from aqueous streams, the polyvalent metal selected from groups IIIA, IIIB, IVA, IVB, VA, VB, VIB, VIIB, and VIII in the periodic table of elements, the process comprising, in order:
    (1) dissolving (a) chitosan or a water soluble salt thereof and (b) a halogenating agent capable of converting chitosan to an N-halochitosan in an aqueous stream that (i) contains said polyvalent metal impurity as a cationic or complex anionic moiety and (ii) is at a pH of 2 to 5.5, wherein an effective amount of N-halochitosan is formed in said aqueous stream to remove said polyvalent metal impurity;
    (2) raising the pH of the aqueous stream to a pH greater than 6, the pH being sufficiently high to form an insoluble product containing the polyvalent metal impurity and said N-halochitosan; and
    (3) separating the insoluble product from the aqueous stream.

2. The process of claim 1 wherein the halogenating agent is selected from the group consisting of sodium hypochlorite, calcium hypochlorite, chlorine, bromine, aqueous chlorine solutions, aqueous bromine solutions, N-chlorosuccinimide, sodium hypobromite, pyridinium bromide perbromide, N-bromosuccinimide, and chloramine T.

3. The process of claim 1 wherein the chitosan is added at a concentration of 0.1 to 5 parts by weight per part by weight of the total soluble polyvalent metal content of the aqueous stream.

4. The process of claim 3 wherein the chitosan contains 45 to 100% 2-deoxy-2-aminoglucose units and 0 to 55% 2-deoxy-2-acetamidoglucose units.

5. The process of claim 4 wherein the polyvalent metal is selected from the group consisting of aluminum, vanadium, chromium, cobalt, zirconium, palladium, cadmium, antimony, osmium, platinum, mercury, lead, thallium, and uranium.

6. The process of claim 1 wherein the quantity of halogenating agent added corresponds to 0.1 to 1.5 positive halogens per amino group of chitosan added.

7. The process of claim 1 wherein the chitosan contains 45 to 100% 2-deoxy-2-aminoglucose units and 0 to 55% 2-deoxy-2-acetamidoglucose units.

8. The process of claim 1 wherein the pH is raised to 6 to 7.5.

9. The process of claim 8 wherein the polyvalent metal is selected from the group consisting of aluminum, vanadium, chromium, cobalt, zirconium, palladium, cadmium, antimony, osmium, platinum, gold, mercury, lead, thallium, and uranium.

10. The process of claim 9 wherein the chitosan is added at a concentration of 0.1 to 5 parts by weight per part by weight of the total soluble polyvalent metal content of the aqueous stream.

11. The process of claim 10 wherein the chitosan contains 45 to 100% 2-deoxy-2-aminoglucose units and 0 to 55% 2-deoxy-2-acetamidoglucose units.

12. The process of claim 11 wherein the pH is raised to 6 to 7.5.

13. The process of claim 12 wherein the quantity of halogenating agent added corresponds to 0.3 to 1.0 positive halogens per amino group of chitosan added.

14. The process of claim 13 wherein the halogenating agent is selected from the group consisting of sodium hypochlorite, calcium hypochlorite, chlorine, bromine, aqueous chlorine solutions, aqueous bromine solutions, N-chlorosuccinimide, sodium hypobromite, pyridinium bromide perbromide, N-bromosuccinimide, and chloramine T.

15. The process of claim 14 wherein the chitosan is added at a concentration of 0.25 to 2.5 parts by weight per part by weight of the total soluble polyvalent metal content of the aqueous stream.

16. The process of claim 15 wherein the chitosan contains at least 80% 2-deoxy-2-aminoglucose units and 20% or fewer 2-deoxy-2-acetamidoglucose units.

17. The process of claim 16 wherein the polyvalent metal is selected from the group consisting of aluminum and vanadium.

18. The process of claim 10 wherein the polyvalent metal is selected from the group consisting of aluminum and vanadium.

* * * * *